UNITED STATES PATENT OFFICE.

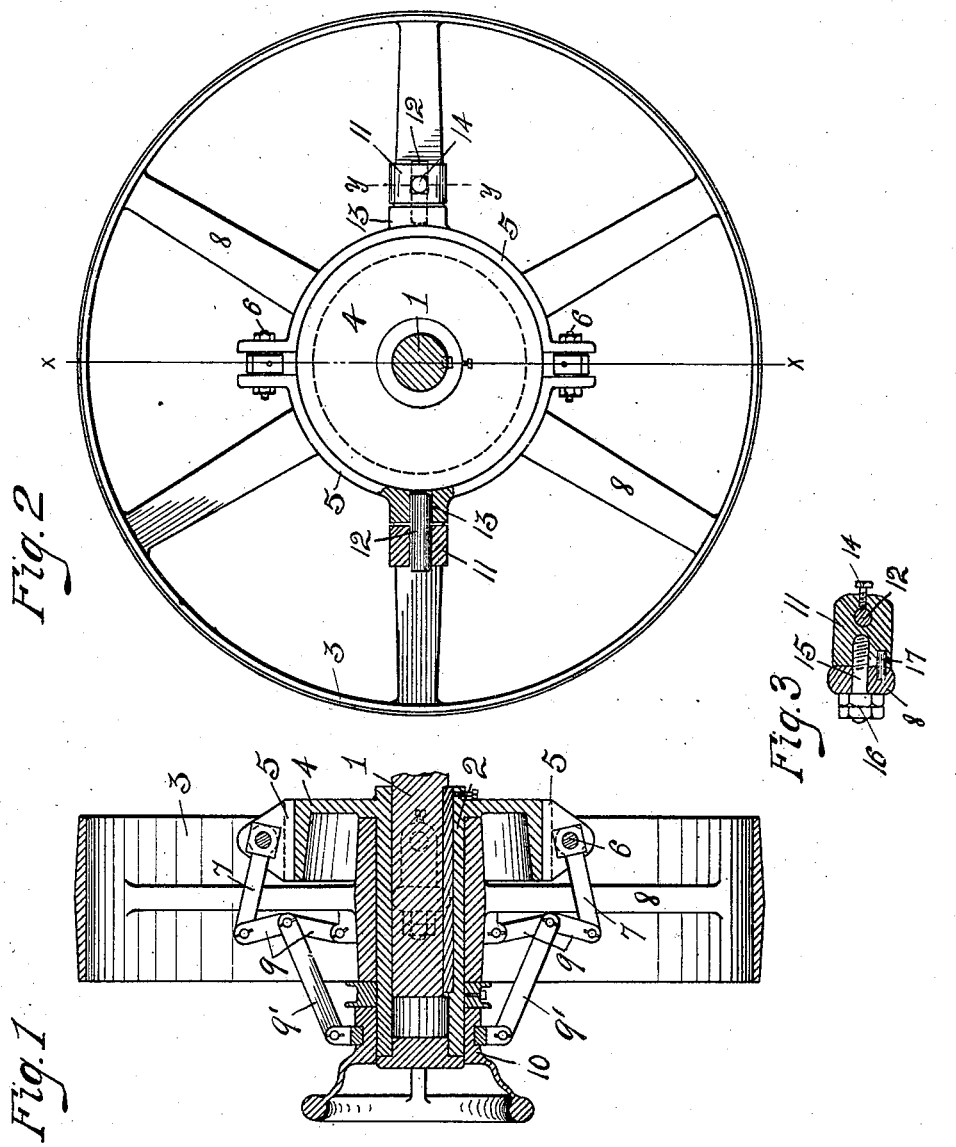

ANTHONY L. HERKENHOFF, OF MINSTER, OHIO.

FRICTION-CLUTCH.

No. 880,528.  Specification of Letters Patent.  Patented March 3, 1908.

Application filed October 14, 1907. Serial No. 397,259.

*To all whom it may concern:*

Be it known that I, ANTHONY L. HERKENHOFF, a citizen of the United States, and a resident of Minster, in the county of Auglaize and State of Ohio, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to friction-clutches of the class employing a split brake-ring, and particularly to such appliances as are adapted for use upon gas engines, but is not restricted to such use.

The object of my invention is the provision of a simple, and highly efficient clutch of this class which is capable of being easily and quickly removed from one pulley and put on another, thus making different sized pulleys interchangeable on a clutch, so that a change of pulley will only be required to obtain a change of speed from the engine or associated drive shaft.

Another object of my invention is to so mount the clutch-ring segments that the centrifugal force thereon when the clutch is thrown out of engagement will throw them away from the friction drum or coacting clutch part, thus enhancing the practicability and commercial value of the clutch and reducing the frictional resistance and wear between the clutch parts to a minimum.

The operation, construction and arrangement of the parts of the invention are fully described in the following specification and illustrated in the accompanying drawings, in which,—

Figure 1 is a central section of the clutch mechanism embodying my invention with its pulley taken on the line $x$ $x$ in Fig. 2. Fig. 2 is a side elevation thereon with a portion in section, and Fig. 3 is a section taken on the line $y$ $y$ in Fig. 2.

Referring to the drawings, 1 designates the projecting end of a drive-shaft, and 2 a sleeve, which is keyed to the shaft and loosely carries the pulley 3. At one end of the sleeve 2 is formed a hub or brake-wheel 4, which is fashioned to encircle the contiguous hub end of the pulley and carries the coacting ring segments 5, 5 forming the split clutch-band of the mechanism. The contiguous ends of the two ring segments 5, 5 are connected by right and left-hand threaded pins 6, each of which has an arm 7 rigidly projecting therefrom between opposed sets of spokes 8 of the pulley, as shown, thus adapting an oscillation of said arms to effect a turning of the pins 6 to loosen or tighten the segments 5, 5 relative to the clutch-wheel or hub 4. The ends of the arms 7 and pulley hub are connected by radially disposed sets of toggle-arms 9, as shown, each of which sets of toggle-arms is in turn connected by a link 9' to a shipper member 10, which is shown as comprising a hand-wheel that is slidingly carried at the end of the sleeve 2 opposed to the brake-wheel.

Secured to the two opposing spokes 8 of the pulley without the segments 5, 5 and standing in the plane of radial movement thereof are the blocks 11, 11, each of which carries a drive pin 12, the inner end of which projects loosely within a socketed portion 13 provided centrally of the contiguous segment, as shown. The pins 12 are secured in their respective blocks by set-screws 14, or in any other suitable or convenient manner. While the blocks 11 may be secured to the spokes in any suitable manner, they are preferably, for convenience of removal, each secured by a single stud-bolt 15, which projects from the block through an opening in the spoke and carries the nuts 16 at its outer end, and is prevented from turning relative to the spoke by a dowel-pin 17, as shown in Fig. 3. The blocks 11 are so positioned relative to the segments 5 as to enable the latter to play longitudinally on the pins 12 and be thrown outwardly under centrifugal force against the blocks and free from engagement with the brake-wheel 4 when the clutch is in released position. This feature of my invention is a very important one in the practical and efficient working of a clutch of this class, as it enables the sections of the split-ring when released to have free centrifugal movements relative to the brake-wheel to stand out of engagement therewith and also enables a pulley to be easily and quickly removed from the clutch and another substituted therefor by simply removing the nuts 16, holding the blocks 11 to the pulley spokes, and then withdrawing the pulley from the sleeve 2 after first disconnecting the toggles 9 from the lever 7 and pulley and removing the hand-wheel 10 for such purpose.

It is apparent in the operation of my improved clutch that a shifting of the hand-wheel 10 to its inward position, as shown in Fig. 1, will turn the threaded pins 6 connecting the ends of the ring sections in the proper direction to contract such sections upon the brake-wheel 4, thus causing the pulley to be frictionally rotated with the brake-hub and shaft. Upon a release of the clutch the centrifugal force acting on the ring segments causes them to move outwardly on the drive-pins 2 until they abut against the blocks 11, thus limiting the outward movement of the segments.

I wish it understood that I do not restrict the improved feature of my clutch to use in connection with any particular form of clutch operating mechanism; nor do I wish to limit myself to the exact details of construction and arrangement of the parts of the invention shown and described, as obvious modifications will occur to persons skilled in the art.

Having thus described my invention, what I claim as new and desire to secure by Letters Patent, is,—

1. In combination in a friction-clutch, a pulley, a drive-member, a split brake-ring adapted when contracted to frictionally engage the periphery of the drive-member and having its sections provided with sockets, a block associated with each ring section and removably attached to a pulley spoke without the ring, a drive-pin carried by each block and projecting inwardly from the block and loosely into the socket of the associated ring-section, said blocks being positioned to permit the ring-sections, actuated by centrifugal force, to move radially out of engagement of the drive-member, and mechanism for effecting a contraction of the ring-sections upon the drive-member.

2. The combination with the drive-member, the split brake-ring coacting therewith, and the driven-member of a friction clutch mechanism, of a part carried by the driven-member in association with each ring-section and coöperating therewith to permit a limited centrifugal movement thereof when the brake-ring is released from the drive-member.

3. In combination in a friction-clutch, a pulley, a brake-wheel, a split-ring coöperating therewith and having its sections socketed, blocks removably secured to the pulley spokes and standing laterally thereof in the plane of radial movement of the ring-sections, and a drive-pin carried by each block and projecting inwardly therefrom loosely within the socket of the associated ring-section, the expanding movements of the ring-sections being guided by the drive-pins and limited by the blocks.

In testimony whereof I have hereunto signed my name to this specification in the presence of two subscribing witnesses.

ANTHONY L. HERKENHOFF.

Witnesses:
JOSEPH A. SCHMUECKER,
JULIUS DILLMAN.